(12) United States Patent
Zhao et al.

(10) Patent No.: US 11,809,350 B2
(45) Date of Patent: Nov. 7, 2023

(54) SERIAL INTERRUPT METHOD, DEVICE, SERIAL INTERRUPT PROCESSING METHOD, AND PROCESSOR

(71) Applicant: Phytium Technology Co., Ltd., Tianjin (CN)

(72) Inventors: Xiaofan Zhao, Tianjin (CN); Lizheng Fan, Tianjin (CN); Cai Chen, Tianjin (CN); Fudong Liu, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 17 days.

(21) Appl. No.: 17/575,212

(22) Filed: Jan. 13, 2022

(65) Prior Publication Data

US 2022/0229792 A1 Jul. 21, 2022

(30) Foreign Application Priority Data

Jan. 15, 2021 (CN) .......................... 202110053108.7

(51) Int. Cl.
*G06F 13/24* (2006.01)
*G06F 9/30* (2018.01)
*G06F 9/48* (2006.01)
*G06F 13/38* (2006.01)
*G06F 13/42* (2006.01)

(52) U.S. Cl.
CPC .......... *G06F 13/24* (2013.01); *G06F 9/30101* (2013.01); *G06F 9/4812* (2013.01); *G06F 13/385* (2013.01); *G06F 13/4291* (2013.01)

(58) Field of Classification Search
CPC .. G06F 13/24; G06F 13/4291; G06F 9/30101; G06F 9/4812; G06F 13/385
See application file for complete search history.

(56) References Cited

U.S. PATENT DOCUMENTS

| 5,671,421 A | * | 9/1997 | Kardach | ................. G06F 13/24 710/48 |
| 2003/0212844 A1 | * | 11/2003 | Wang | ...................... G06F 13/24 710/266 |
| 2005/0060470 A1 | * | 3/2005 | Main | ................... G06F 13/4027 710/305 |

FOREIGN PATENT DOCUMENTS

| CN | 102622320 A | 8/2012 |
| CN | 105373423 A | 3/2016 |
| CN | 110399324 A | 11/2019 |

* cited by examiner

*Primary Examiner* — Zachary K Huson
(74) *Attorney, Agent, or Firm* — ANOVA LAW GROUP, PLLC

(57) ABSTRACT

A serial interrupt method includes receiving a blank serial interrupt request signal (SerIRQ) and a level signal of a peripheral, based on the blank SerIRQ, generating an indication SerIRQ including an indication interrupt bit (IRQ_n) according to the level signal, and sending the instruction SerIRQ to a processor. The indication IRQ_n identifies the peripheral based on a binary code represented by a first level and a second level.

20 Claims, 6 Drawing Sheets

SERIAL INTERRUPT METHOD, DEVICE, SERIAL INTERRUPT PROCESSING METHOD, AND PROCESSOR

CROSS-REFERENCES TO RELATED APPLICATION

This application claims priority to Chinese Application No. 202110053108.7 filed on Jan. 15, 2021, the entire content of which is incorporated herein by reference.

TECHNICAL FIELD

The present disclosure generally relates to the processor field and, more particularly, to a serial interrupt method, a device, a serial interrupt processing method, and a processor.

BACKGROUND

A low pin count (LPC) bus is configured to connect a low-bandwidth device and an "old" device to a central processing unit (CPU). The common low-bandwidth device includes a basic input-output system (BIOS), a serial interface, a parallel interface, a floppy disk controller, etc. The "old" device includes a programmable interrupt controller, a programmable timer, etc. The device connected to the CPU through the LPC bus is collectively referred to as an external device or peripheral. At present, the LPC-based serial interrupt solution includes indicating the peripheral that requests the interrupt to the CPU through the serial interrupt signal. Thus, the CPU performs a corresponding interrupt response to the interrupt request of the peripheral.

SUMMARY

Embodiments of the present disclosure provide a serial interrupt method. The method includes receiving a blank serial interrupt request signal (SerIRQ) and a level signal of a peripheral, based on the blank SerIRQ, generating an indication SerIRQ including an indication interrupt bit (IRQ_n) according to the level signal, and sending the indication SerIRQ to a processor. The indication IRQ_n identifies the peripheral based on a binary code represented by a first level and a second level.

Embodiments of the present disclosure provide a serial interrupt device, including an interrupt signal receiver, an interrupt request generator, and an interrupt signal transmitter. The interrupt signal receiver is configured to receive a blank SerIRQ and a level signal of a peripheral. The interrupt request generator is configured to generate an indication SerIRQ including an indication IRQ_n according to the level signal based on the blank SerIRQ. The indication IRQ_n is used to identify the peripheral based on a binary code represented by a first level and a second level. The interrupt signal transmitter is configured to send the indication SerIRQ to the processor.

Embodiments of the present disclosure provide a serial interrupt processing method. The method includes receiving an indication SerIRQ and performing a serial interrupt response based on the indication IRQ_n. The indication SerIRQ includes an indication IRQ_n. The indication IRQ_n is used to identify a peripheral requesting an interrupt based on a binary code represented by a first level and a second level.

The serial interrupt method, device, serial interrupt processing method, and processor of embodiments of the present disclosure may use the binary code represented by the first level and the second level to identify the peripheral requesting the interrupt to expand the number of peripherals requesting the interrupts.

DETAILED DESCRIPTION OF THE EMBODIMENTS

The technical solutions of embodiments of the present disclosure are described in detail below in connection with the accompanying drawings of embodiments of the present disclosure. Apparently, described embodiments are only some embodiments of the present disclosure rather than all embodiments. Based on embodiments of the present disclosure, all other embodiments obtained by those of ordinary skill in the art without creative efforts shall be within the scope of the present disclosure.

The terms "first," "second," and similar words used in the present disclosure do not indicate any order, quantity, or importance but are only used to distinguish different components. Similarly, "including," "containing," or another similar word means that an element or item appearing before the word covers the element or item listed after the word and their equivalents but does not exclude other elements or items. Similar words such as "connected" or "coupled" are not limited to physical or mechanical connections but may include an electrical connection, no matter a direct or indirect connection.

Figure 1:
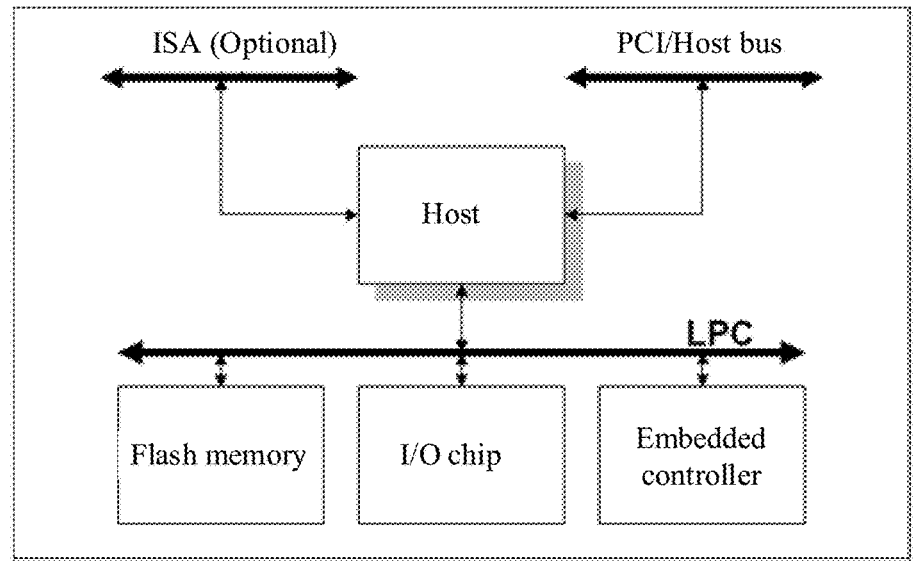
FIG. 1 is a schematic diagram of a system connection based on a low pin count (LPC) bus according to some embodiments of the present disclosure.

In a computer system, low-speed peripherals may be connected to a central processing unit (CPU) through a low pin count (LPC) bus. FIG. 1 is a schematic diagram of a system connection based on the LPC bus according to some embodiments of the present disclosure. Flash memory, an I/O chip (Super I/O), and an embedded controller may be connected to the LPC bus and connected to a peripheral component interconnect (PCI), e.g., CPU, or a host bus and an industry-standard architecture (ISA) bus via a host. In some embodiments, the peripheral may be connected to the LPC bus through a general-purpose input/output (GPIO) interface.

An LPC-based interrupt type may include a serial interrupt request (IRQ) and a direct memory access (DMA) interrupt. These two interrupt methods may share an interrupt number of a general interrupt controller (GIC) of the CPU.

Figure 2A:
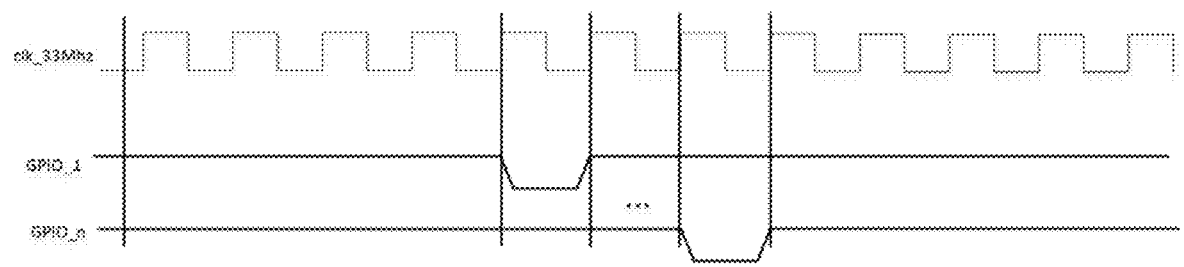
FIG. 2A is a schematic diagram of an external electrical level signal in the electrical level interrupt method according to some embodiments of the present disclosure.

In some embodiments, the LPC-based serial IRQ may be different from a common peripheral level interrupt. In a level interrupt mode, the peripheral may lower a corresponding level signal to realize an interrupt report. That is, a level signal from the GPIO may only need to have a descending edge to trigger a complex programmable logic device (CPLD) to cause the CPLD to send an interrupt request to the CPU. A specific implementation method may include obtaining a level signal status of the GPIO multiple times and storing the level signal status in a register. If two adjacent bits of the register change from 1 to 0, the descending edge occurs. Similarly, if the two adjacent bits change from 0 to 1, an ascending edge occurs. FIG. 2A is a schematic diagram of a peripheral electrical level signal in the level interrupt mode according to some embodiments of the present disclosure. FIG. 2A illustrates a clock signal clk_33Mhz and level signals GPIO_1 and GPIO_n. clk_33Mhz represents a clock signal with a frequency of 33 MHz. Level signal GPIO_1 corresponds to a peripheral connected to GPIO interface 1 and may include a level signal used to request an interrupt. Level signal GPIO_n corresponds to a peripheral connected to GPIO interface n and may include a level signal used to request an interrupt. Different peripherals may correspond to different clock positions of the signal. A total number N of peripherals that support the connection may be set by the CPU. N may be a positive integer. When the peripheral does not need to perform an interrupt request, the level signal may be a high level. When the peripheral needs to perform an interrupt request, the peripheral may lower the level signal at the clock position corresponding to the peripheral to realize the interrupt request. In other words, the peripheral may realize the interrupt request by lowering the signal at the corresponding clock position. The high level and low level are just examples. When the peripheral does not need to perform an interrupt request, the level signal may be a low level. When the peripheral needs to perform an interrupt request, the peripheral may increase the level signal at the clock position corresponding to the peripheral, which is not limited here.

Figure 2B:
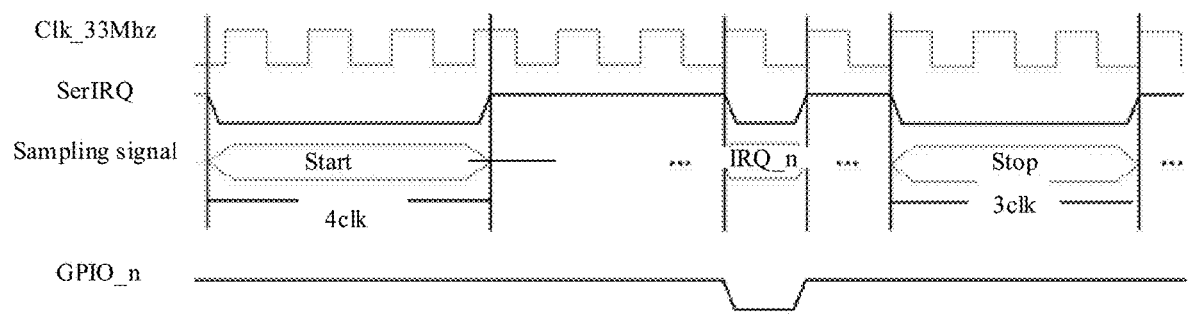
FIG. 2B is a schematic diagram of a serial interrupt request signal (SerIRQ) based on LPC according to some embodiments of the present disclosure.

Compared to the level interrupt mode, an LPC-based serial interrupt request signal (SerIRQ) may include a start frame (start), an interrupt bit (IRQ_n), and an end frame (stop). The peripheral may be connected to the LPC bus through the GPIO interface. When the peripheral needs to perform an interrupt request, the peripheral may lower the signal at the corresponding clock position and output the signal to a serial interrupt device. The serial interrupt device may generate the serial interrupt request signal, including the start frame, the interrupt bit, and the end frame. An identifier of the GPIO interface, which requests interrupt, may be marked at the interrupt bit. FIG. 2B is a schematic diagram of the LPC-based SerIRQ according to some embodiments of the present disclosure. GPIO interface n, which requests an interrupt, may generate a level signal GPIO_n. The serial interrupt device may generate a SerIRQ based on level signal GPIO_n. The SerIRQ may include the start, the IRQ_n, and the stop. IRO_n located at a low-level position may be used to identify the GPIO interface that requests an interrupt. For example, the CPU may recognize the IRQ of the peripheral device based on the SerIRQ shown in FIG. 2B and perform a corresponding interrupt response.

Figure 2C:
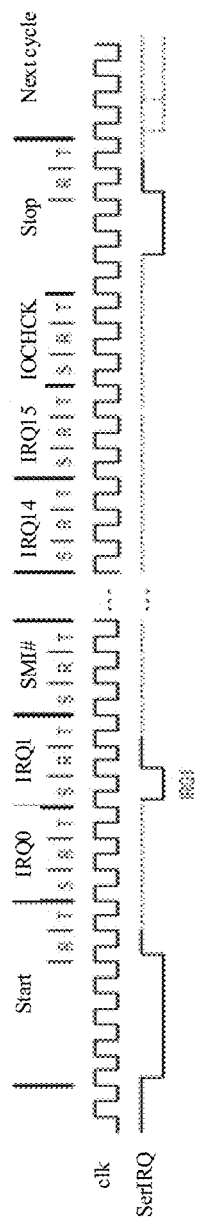
FIG. 2C is a schematic diagram of the SerIRQ according to some embodiments of the present disclosure.

In some embodiments, each device frame in the SerIRQ may correspond to 3 clock cycles. FIG. 2C is a schematic diagram of the SerIRQ according to some embodiments of the present disclosure. As shown in FIG. 2C, first, SerIRQ includes the start. The start frame may usually include 4-8 clock cycles, which may be controlled by a host controller or the peripheral. Then, SerIRQ includes IRQ_n. Different peripherals may correspond to different clock positions. FIG. 2C shows different device frames, including IRQ0, IRQ1, SMI#, . . . , IRQ14, IRQ15, and IOCHCK. IRQ_n may be used to identify the peripheral that requests the interrupt through the low level of the corresponding position. For example, in FIG. 2C, the position of IRQ1 is the low level, which indicates that the peripheral currently requesting the interrupt corresponds to IRQ1. Each device frame corresponds to 3 clock cycles, which are represented as S, R, and T, respectively. S represents a sample signal (Sample), R represents a reset signal (Recovery), and T represents a turn-around signal (Turn-around). In some embodiments, for IRQ1 requesting the interrupt, only the S signal is the low level. Generally, the R signal and T signal are high levels. Next, SerIRQ includes the stop. The stop may usually include 2 or 3 clock cycles.

Table 1 shows the sampling period of the SerIRQ.

TABLE 1

| SerIRQ sampling period | | |
|---|---|---|
| IRQ/Data frame | Sampling frame | Clock cycles after start |
| 1 | IRQ0 | 2 |
| 2 | IRQ1 | 5 |
| 3 | SMI# | 8 |
| 4 | IRQ3 | 11 |
| 5 | IRQ4 | 14 |
| 6 | IRQ5 | 17 |
| 7 | IRQ6 | 20 |
| 8 | IRQ7 | 23 |
| 9 | IRQ8 | 26 |
| 10 | IRQ9 | 29 |
| 11 | IRQ10 | 32 |
| 12 | IRQ11 | 35 |
| 13 | IRQ12 | 38 |
| 14 | IRQ13 | 41 |
| 15 | IRQ14 | 44 |
| 16 | IRQ15 | 47 |
| 17 | IOCHCK# | 50 |

As shown in Table 1, for each IRQ/data frame, (IRQ/data frame×3−1) clock cycles are required after the high level of the start. For example, for the sampling frame IRQ1, 5 clock cycles may be required after the high level of the start. That is, for IRQ1, the 5th cycle after the high level of the start is the low level, which indicates that IRQ1 requests an interrupt. For another example, for the sampling frame IRQ5, 6×3−1=17 clock cycles are required after the high level of the start. That is, for IRQ5, the 17th cycle after the high level of the start is the low level, which indicates that IRQ5 requests an interrupt. In other words, in the SerIRQ, the low level at the corresponding clock position may be used to identify the peripheral that requests the interrupt. That is, the peripheral identifier and the clock position may have a one-to-one correspondence.

Based on FIG. 2C and Table 1, in practical applications, each sampling frame actually needs to include 3 clock cycles, which correspond to the S signal, R signal, and T signal in FIG. 2C, respectively. The S signal may be used to indicate an interrupt peripheral. To simplify the description, only one clock cycle is shown below. That is, only the S signal is described.

From the above description, the interrupt peripheral indication method may need to consume relatively many clock cycles. When relatively many peripherals need to be indicated, a large number of clock cycles may be required, which is not beneficial for fast processing the interrupt requests.

Embodiments of the present disclosure provide a serial interrupt method, which uses binary codes represented by a first level and a second level to identify the peripheral requesting the interrupt to expand the number of peripherals requesting the interrupts. Compared with the method of indicating the interrupt peripheral by the low level of the corresponding clock position of the SerIRQ shown in FIG. 2B, the number of peripherals that can be identified may be effectively increased with the same clock cycles.

Figure 3:
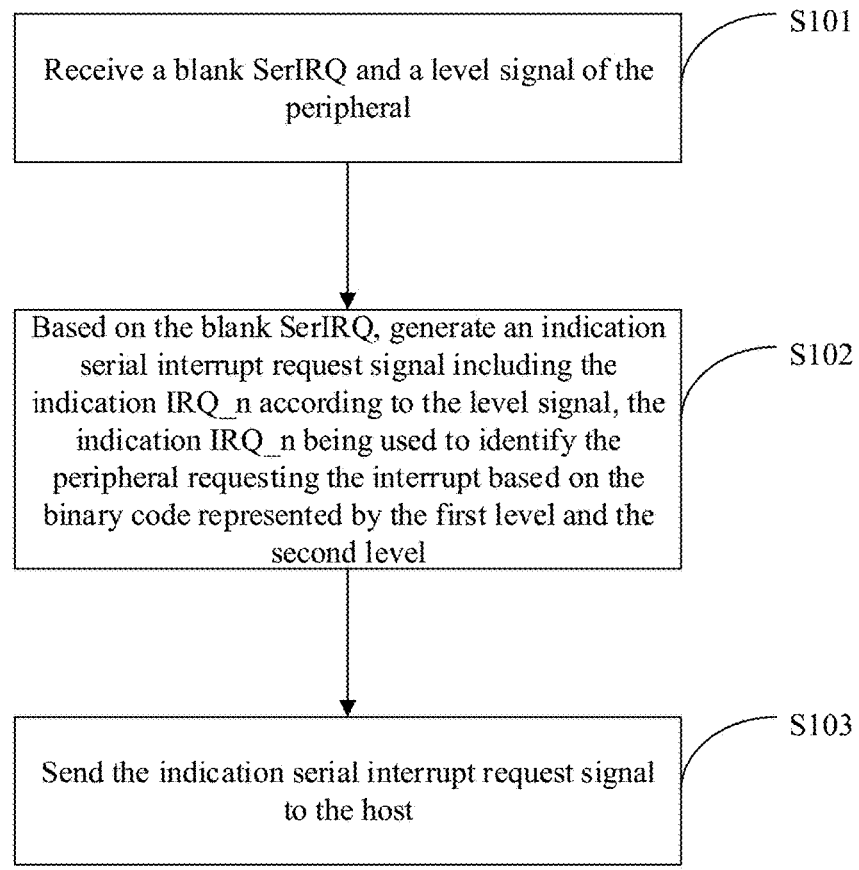
FIG. 3 is a schematic flowchart of calculation of a serial interrupt method according to some embodiments of the present disclosure.

FIG. 3 is a schematic diagram of the serial interrupt method according to some embodiments of the present disclosure. As shown in FIG. 3, the method includes processes S101 to S103. First, at process S101, a blank SerIRQ and a level signal of the peripheral are received. According to embodiments of the present disclosure, the level signal of the peripheral device may be the level signal shown in FIG. 2A and sent by the peripheral device through the GPIO interface. The level signal of the peripheral may correspond to the peripheral.

According to embodiments of the present disclosure, receiving the blank SerIRQ may include receiving the blank SerIRQ from the processor or the peripheral. The blank SerIRQ may include a start, a stop, and a blank IRQ_n located between the start and the stop. The blank IRQ_n may include a first level having a plurality of clock cycles. For example, the blank SerIRQ may refer to the SerIRQ in FIG. 2B, which may not include the valid IRQ_n. In other words, the IRQ_n of the blank SerIRQ may be high level (i.e., the first level), which may not include information used to indicate the interrupt peripheral. A serial interrupt may include a quiet model and a continue model. When the LPC interrupt is in the quiet model, when there is no interrupt request, the IRQ_n of the SerIRQ line may be high level. When the peripheral needs to report an interrupt to the CPU, the peripheral may send the start, the IRQ_n, and the stop to the SerIRQ line. Thus, the serial interrupt device may receive a blank SerIRQ from the peripheral. When the LPC interrupt is in the continuous model, regardless of whether the peripheral reports an interrupt or not, the CPU will always send out the start and the stop. When the peripheral needs to report the interrupt, the position of the start may need to be detected, and the peripheral may lower the clock high level corresponding to the clock position corresponding to the peripheral. When the stop is sent, the interrupt will be reported to the GIC of the CPU. In this case, for example, the serial interrupt device may receive the blank SerIRQ from the processor, such as the CPU.

Still referring to FIG. 3, in process S102, based on the blank SerIRQ, an indication serial interrupt request signal including the indication IRQ_n is generated according to the level signal. According to embodiments of the present disclosure, the indication IRQ_n may be used to identify the peripheral requesting the interrupt based on the binary code represented by the first level and the second level. In process S103, the indication serial interrupt request signal is sent to the processor such as the CPU, so that the CPU performs corresponding interrupt processing.

A process of generating the indication serial interrupt request signal, including the indication IRQ_n according to the level signal (i.e., process S102) will be described in detail below.

According to some embodiments of the present disclosure, the serial interrupt method may further include assigning a unique binary code to the peripheral and storing a correspondence between the level signal of the peripheral and the binary code. In the method according to the present disclosure, the IRQ_n of the SerIRQ may use the binary code to identify the peripheral requesting the interrupt, that is, the corresponding GPIO interface. First, the connected peripheral may be coded. That is, a unique binary code may be assigned to the peripheral. For example, 8 peripherals (denoted as GPIO_0 to GPIO_7) may need to be indicated. GPIO_0 may correspond to binary code 000, GPIO_1 may correspond to binary code 001, and so on, GPIO_7 may correspond to binary code 111.

According to some embodiments of the present disclosure, generating the indication serial interrupt request signal, including the indication IRQ_n may include determining the binary code of the peripheral based on the received level signal and the correspondence between the stored level signal and the binary code. When the interrupt request is required, the peripheral may first send the level signal through the GPIO interface. For example, the peripheral may send the level signal GPOI_1 through the GPOI_1 interface shown in FIG. 2A. Based on the level signal GPOI_1 and the correspondence between the level signal and the binary code, the binary code of the peripheral requesting the interrupt may be determined to be 001. Then, according to the binary code, the blank IRQ_n may be converted into an indication IRQ_n. The first level of the indication IRQ_n may represent the low binary bit, and the second level of the indication IRQ_n may represent the high binary bit. For example, the first level may be the high level, and the second level may be the low level. That is, the high level of the indication IRQ_n may represent binary 0, and the low level of the indication IRQ_n may represent binary 1.

Figure 4:
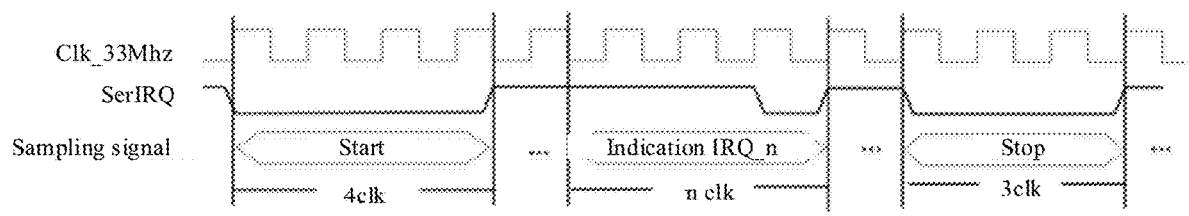
FIG. 4 is a schematic diagram of a SerIRQ according to some embodiments of the present disclosure.

FIG. 4 is a schematic diagram of the SerIRQ according to some embodiments of the present disclosure. In FIG. 4, clk_33Mhz is a clock signal with a frequency of 33 MHz. SerIRQ is an indication SerIRQ according to embodiments of the present disclosure and includes the start, the indication IRQ_n, and the stop. FIG. 4 also shows an example that 8 peripherals (GPOI_0 to GPIO_7) need to be indicated. That is, n is 3 here. For the indication IRQ_n, assuming that the interface requesting the interrupt may be the GPOI_1 interface, the binary code corresponding to the GPOI_1 interface may be 001. Therefore, in the indication IRQ_n, the binary code 001 may be represented by the high level and the low level. When 8 GPIO interfaces need to be indicated, only 3 clock cycles may be required (i.e., 3 S signals shown in FIG. 2C, actually 3×3=9 clock cycles, including 3 S signals, 3 R signals, and 3 T signals. FIG. 4 only illustrates the clock cycle of the S signal.). The start may take 4-8 clock cycles (FIG. 4 illustrates 4 clock cycles, that is, 4 clk.). The stop may take 2 or 3 clock cycles. In the quiet model, the stop may take 2 clock cycles. In the continue model, the stop may correspond to 3 clock cycles (FIG. 4 illustrates 3 clock cycles, that is, 3 clk).

In embodiments according to the present disclosure, for N clock cycles of the indication IRQ_n, the high level or the low level of the signal level may be taken as 0 or 1 in the binary code. Thus, a total number N of signal levels may be used to indicate $2^N$ GPIO interfaces. Therefore, the number of clock cycles used to indicate the interrupt GPIO interface may be effectively reduced.

According to some embodiments of the present disclosure, the method may further include sending the correspondence between the level signal of the peripheral and the binary code to the processor. The processor may be configured to determine the peripheral indicating the interrupt based on the correspondence and the indication IRQ_n of the indication SerIRQ when receiving the indication SerIRQ, that is, determine which peripheral requests the interrupt. For example, a corresponding storage area or register may be added to the CPU to store the correspondence. Thus, the CPU may be configured to determine the GPIO interface requesting the interrupt based on the correspondence after receiving the SerIRQ. For example, the CPU may know that the GPIO interface requesting the interrupt of the SerIRQ shown in FIG. 4 is GPIO_1.

According to some embodiments of the present disclosure, a number of clock cycles included in the blank IRQ_n may be set by the processor. For example, the CPU may set the number of peripherals that can be connected via the LPC bus, e.g., 16 or 32. After the number of peripherals is determined, the number of clock cycles included in the blank IRQ_n in the SerIRQ for performing the serial interrupt request may be determined. In other words, the number of clock cycles included in the blank IRQ_n may be determined by the number of connected peripherals.

According to some embodiments of the present disclosure, the serial interrupt method may further include setting an interrupt mask register. The interrupt mask register may include a mask indication bit, which is used to indicate whether to mask the serial interrupt. In some embodiments, sending the indication SerIRQ to the processor may include detecting the mask indication bit in the interrupt mask register and sending the indication SerIRQ to the processor when the mask indication bit of the interrupt mask register is detected to be a predetermined bit.

For example, interrupt mask register int_mask[1:0] may be set. The register may include, for example, two bits and may be configured to determine whether to report the received interrupt request to the CPU. As described above, the LPC-based interrupt types may include a serial interrupt and a DMA interrupt. Therefore, the high bit of the interrupt mask register may be used as a serial interrupt mask bit. When the high bit is 1, the serial interrupt may be masked. That is, the SerIRQ may not be reported to the CPU, and the predetermined bit of the mask indication bit may be 1. When the high bit is 0, the serial interrupt may be reported to the CPU. In addition, the low bit of the interrupt mask register may be used as the mask bit for the DMA interrupt, which functions similarly as the mask bit of the serial interrupt. By setting the interrupt mask bit, whether to report the interrupt may be determined by software.

Figure 5:
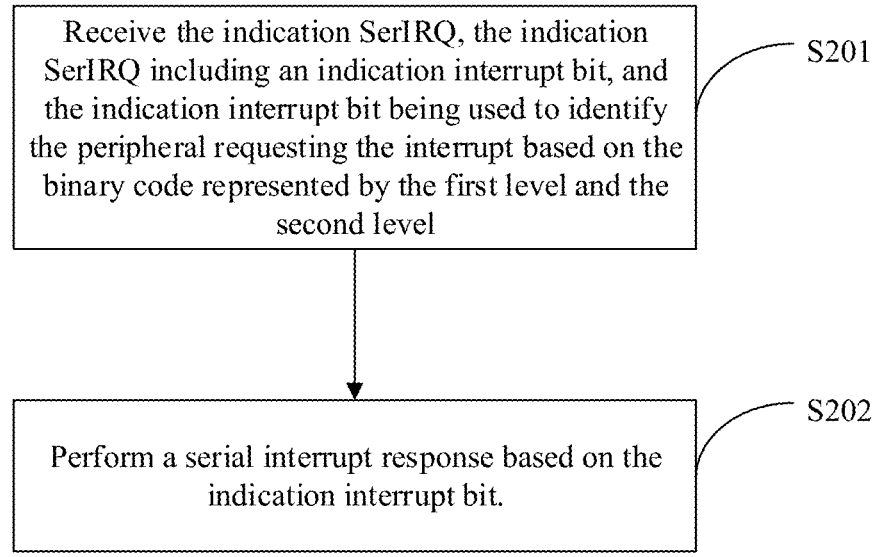
FIG. 5 is a schematic flowchart of a serial interrupt processing method according to some embodiments of the present disclosure.

According to another aspect of the present disclosure, embodiments of the present disclosure further provide a serial interrupt processing method. FIG. 5 is a schematic flowchart of the serial interrupt processing method according to some embodiments of the present disclosure.

As shown in FIG. 5, the serial interrupt processing method includes process S201 and process S202. First, in process S201, the indication SerIRQ is received. The indication SerIRQ includes an indication interrupt bit. The indication interrupt bit may be used to identify the peripheral requesting the interrupt based on the binary code represented by the first level and the second level. Next, in process S202, a serial interrupt response is performed based on the indication interrupt bit.

According to embodiments of the present disclosure, generating the indication SerIRQ by the serial interrupt device may include receiving the blank SerIRQ and the level signal of the peripheral and generating the indication SerIRQ including the indication IRQ_n according to the level signal based on the blank SerIRQ.

According to embodiments of the present disclosure, the blank SerIRQ may include the start, the stop, and the blank IRQ_n located between the start and the stop. The blank IRQ_n may include the first level of the plurality of clock cycles. The serial interrupt device generating the indication SerIRQ including the indication IRQ_n may include determining the binary code of the peripheral based on the received level signal and the correspondence between the level signal of the peripheral and the binary code and converting the blank IRQ_n into the indication IRQ_n according to the binary code. The first level of the indication IRQ_n may represent the low binary bit. The second level of the indication IRQ_n may represent the high binary bit.

Therefore, in the serial interrupt processing method according to embodiments of the present disclosure, the indication SerIRQ may be generated according to the serial interrupt method described above in connection with FIG. 3. For a specific generation process, reference may be made to the above description, which is not repeated here. In the indication IRQ_n of the indication SerIRQ, the high level and the low level of the signal level may be taken as 0 or 1 in the binary code. Thus, the total number N of signal levels may be used to indicate $2^N$ GPIO interfaces. Therefore, the number of clock cycles used by the GPIO interface to indicate the interrupt may be effectively reduced.

According to embodiments of the present disclosure, the serial interrupt processing method may further include receiving and storing the correspondence between the level signal of the peripheral and the binary code. In the correspondence, the level signal of the peripheral and the binary code may have the one-to-one correspondence. Thus, the peripheral requesting the interrupt may be determined based on the correspondence between the level signal of the peripheral and the binary code and the indication IRQ_n. A serial interrupt response may be performed on the determined peripheral.

Figure 6:
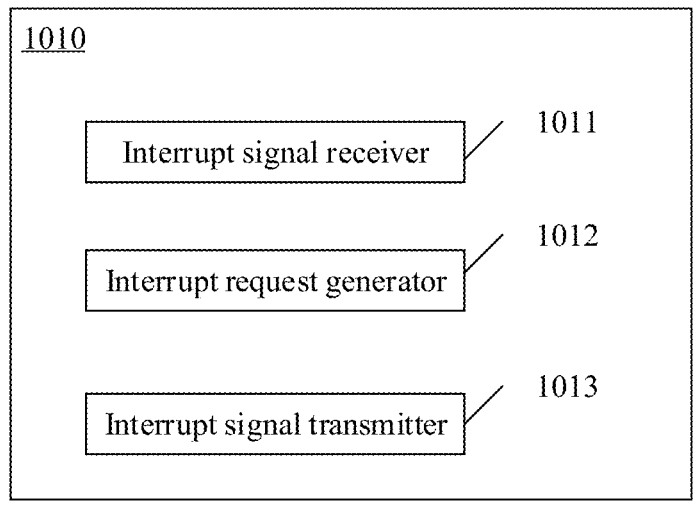
FIG. 6 is a schematic block diagram of a serial interrupt device according to some embodiments of the present disclosure.

According to another aspect of the present disclosure, embodiments of the present disclosure further provide a serial interrupt device 1010. FIG. 6 is a schematic block diagram of the serial interrupt device 1010 according to some embodiments of the present disclosure.

As shown in FIG. 6, the serial interrupt device 1010 includes an interrupt signal receiver 1011, an interrupt request generator 1012, and an interrupt signal transmitter 1013. According to some embodiments of the present disclosure, the interrupt signal receiver 1011 may be configured to receive the blank SerIRQ and the level signal of the peripheral. The interrupt request generator 1012 may be configured to generate the indication SerIRQ including the indication IRQ_n according to the level signal based on the blank SerIRQ. The indication interrupt bit may be used to identify the peripheral based on the binary code represented by the first level and the second level. The interrupt signal transmitter 1013 may be configured to send the indication SerIRQ to the processor.

According to some embodiments of the present disclosure, the serial interrupt device 1010 may further be configured to assign the unique binary code to the peripheral and store the correspondence between the level signal of the peripheral and the binary code.

According to some embodiments of the present disclosure, the interrupt signal receiver 1011 may be configured to receive the blank SerIRQ from the processor or from the peripheral device. The blank SerIRQ may include the start, the stop, and the blank IRQ_n between the start and the stop. The blank IRQ_n may include the first level of the plurality of clock cycles.

According to some embodiments of the present disclosure, the interrupt request generator 1012 may be configured to determine the binary code of the peripheral based on the received level signal and the correspondence between the stored level signal and the binary code and converting the blank IRQ_n into the indication IRQ_n according to the binary code. The first level of the indication IRQ_n may represent the low binary bit. The second level of the indication IRQ_n may represent the high binary bit.

According to some embodiments of the present disclosure, the interrupt signal transmitter 1013 may further be configured to send the correspondence between the level signal of the peripheral and the binary code to the processor. The processor may be configured to determine the peripheral requesting the interrupt based on the correspondence and the indication IRQ_n of the indication SerIRQ when receiving the indication serial SerIRQ.

According to some embodiments of the present disclosure, the number of clock cycles included in the blank IRQ_n may be set by the processor.

According to some embodiments of the present disclosure, the interrupt signal transmitter 1013 may further be configured to set the interrupt mask register. The interrupt mask register may include the mask indication bit used to indicate whether to mask the serial interrupt. According to some embodiments of the present disclosure, the interrupt signal transmitter 1013 sending the indication SerIRQ to the processor may include detecting the mask indication bit of the interrupt mask register and sending the indication SerIRQ to the processor when the mask indication bit of the interrupt mask register is detected to be the predetermined bit.

According to embodiments of the present disclosure, for the processes performed by the serial interrupt device 1010, reference may be made to the processes of the serial interrupt method described above in connection with FIG. 3, which is not repeated here. For example, the serial interrupt device of embodiments of the present disclosure may include a device located outside of the CPU and configured to report the serial interrupt. The serial interrupt device may be connected to the peripheral through the GPIO interface and may be connected to the CPU through the host to realize the interrupt reporting process of the peripheral.

Figure 7:
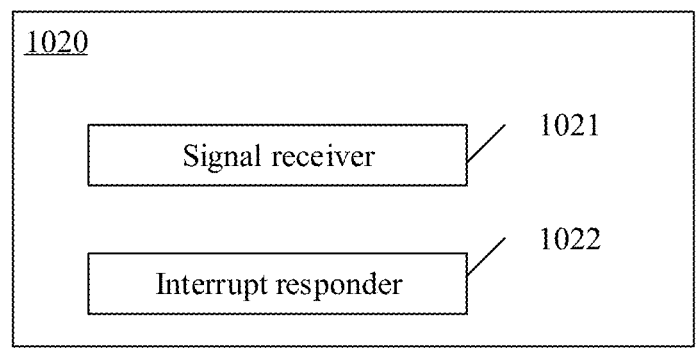
FIG. 7 is a schematic block diagram of a processor according to some embodiments of the present disclosure.

According to another aspect of the present disclosure, embodiments of the present disclosure further provide a processor 1020. FIG. 7 is a schematic block diagram of the processor 1020 according to some embodiments of the present disclosure.

As shown in FIG. 7, the processor 1020 includes a signal receiver 1021 and an interrupt responder 1022. According to some embodiments of the present disclosure, the signal receiver 1021 may be configured to receive the indication SerIRQ. The indication SerIRQ may include the indication interrupt bit. The indication interrupt bit may be used to identify the peripheral requesting the interrupt based on the binary code represented by the first level and the second level. The interrupt responder 1022 may be configured to perform serial interrupt response based on the indication interrupt bit.

According to some embodiments of the present disclosure, the signal receiver 1021 may further be configured to receive and store the correspondence between the level signal of the peripheral and the binary code. In the correspondence, the level signal of the peripheral and the binary code may have the one-to-one correspondence.

According to some embodiments of the present disclosure, generating the indication SerIRQ by the serial interrupt device may include receiving the blank SerIRQ and the level signal of the peripheral and generating the indication SerIRQ including the indication IRQ_n according to the level signal based on the blank SerIRQ. The serial interrupt device may be, for example, the serial interrupt device as shown in FIG. 6 and may be configured to implement the serial interrupt method shown in FIG. 3.

According to some embodiments of the present disclosure, the blank SerIRQ may include the start, the stop, and the blank IRQ_n located between the start and the stop. The blank IRQ_n may include the first level of the plurality of clock cycles. The serial interrupt device generating the indication SerIRQ including the indication IRQ_n may include determining the binary code of the peripheral based on the received level signal and the correspondence between the level signal of the peripheral and the binary code and converting the blank IRQ_n into the indication IRQ_n according to the binary code. The first level of the indication IRQ_n may represent the low binary bit, and the second level of the indication IRQ_n may represent the high binary bit.

According to some embodiments of the present disclosure, the interrupt responder 1022 may be configured to determine the peripheral requesting the interrupt based on the correspondence between the level signal of the peripheral and the binary code and the indication IRQ_n and performing the serial interrupt response to the peripheral.

With the serial interrupt method, device, serial interrupt processing method, and processor of embodiments of the present disclosure, the binary code represented by the first level and the second level may be used to identify the peripheral that requests the interrupt. Thus, the number of peripherals requesting the interrupts may be expanded.

Those skilled in the art can understand that various modifications and improvements may be made to the content disclosed in the present disclosure. For example, the devices or components described above may be implemented by hardware, software, firmware, or a combination thereof.

In addition, although the present disclosure makes various references to a certain unit in the system according to embodiments of the present disclosure, any number of different units may be used and run on the client end and/or the server. The unit is merely illustrative. Different units may be used for different aspects of the system and method.

In the present disclosure, flowcharts are used to illustrate the processes of the method according to embodiments of the present disclosure. Processes in the front or back are not necessarily performed in a precise order. The processes may be performed in reverse order or simultaneously. Meanwhile, another operation may also be added to the processes.

Those of ordinary skill in the art can understand that all or a part of the processes of the above method may be completed by a computer program instructing related hardware. The program may be stored in a computer-readable storage medium, such as a read-only memory, a magnetic disk, or an optical disk. In some embodiments, all or a part of the processes of embodiments of the present disclosure may also be implemented using one or more integrated circuits. Correspondingly, modules/units of embodiments of the present disclosure may be implemented in the form of hardware or software functional modules. The present disclosure is not limited to the combination of any specific form of hardware and software.

Unless otherwise defined, all the terms used here may have the same meaning as commonly understood by those of ordinary skill in the art. Terms such as those defined in an ordinary dictionary should be interpreted as having meanings consistent with their meanings in the context of the related technology, and should not be interpreted in idealized or extremely formalized meanings unless specified here.

The above may be an explanation of the present disclosure and should not be considered as a limitation to the present disclosure. Although several exemplary embodiments of the present disclosure have been described, those skilled in the art may easily understand that many modifications may be made to exemplary embodiments without departing from the novel teaching and advantages of the present disclosure. Therefore, all these modifications are intended to be included in the scope of the invention defined by the claims. The above may be an explanation of the present disclosure and should not be considered as limited to specific embodiments disclosed. Modifications to disclosed embodiments and other embodiments are intended to be included in the scope of the claims. The present invention is defined by the claims and their equivalents.

What is claimed is:

1. A serial interrupt method comprising:
   receiving a blank serial interrupt request signal (SerIRQ) from either a processor or a peripheral and a peripheral level signal from the peripheral;
   based on the blank SerIRQ, generating an indication SerIRQ including a plurality of indication interrupt bits according to the peripheral level signal, the plurality of indication interrupt bits including a binary code represented by a first level and a second level to identify the peripheral; and
   sending the indication SerIRQ to the processor.

2. The method of claim 1, further comprising:
   assigning the binary code to the peripheral before uniquely identifying the peripheral; and
   storing a correspondence between the peripheral level signal of the peripheral and the binary code in advance.

3. The method of claim 2, wherein:
   the blank SerIRQ includes a start, a stop, and a plurality of blank interrupt bits located between the start and the stop, and the plurality of blank interrupt bits are represented in the form of the first level having a plurality of clock cycles.

4. The method of claim 3, wherein generating the indication SerIRQ including the plurality of indication interrupt bits includes:
   determining the binary code of the peripheral based on the received peripheral level signal and the stored correspondence between the peripheral level signal and the binary code; and
   converting the plurality of blank interrupt bits into the plurality of indication interrupt bits according to the binary code, the first level representing a low binary bit, and the second level representing a high binary bit.

5. The method of claim 2, further comprising:
   sending the correspondence between the peripheral level signal of the peripheral and the binary code to the processor, wherein in response to receiving the indication SerIRQ, based on the correspondence and the plurality of indication interrupt bits of the indication SerIRQ, the processor is configured to determine the peripheral requesting an interrupt.

6. The method of claim 3, wherein a number of the clock cycles included in the plurality of blank interrupt bits is set by the processor.

7. The method of claim 1, further comprising:
   setting an interrupt mask register in advance, the interrupt mask register including a mask indication bit used to indicate whether to mask a serial interrupt.

8. The method of claim 7, wherein sending the indication SerIRQ to the processor includes:
   detecting the mask indication bit of the interrupt mask register; and
   in response to detecting that the mask indication bit of the interrupt mask register is a predetermined bit, sending the indication SerIRQ to the processor.

9. A serial interrupt device comprising:
   an interrupt signal receiver configured to receive a blank serial interrupt request signal SerIRQ) from either a processor or a peripheral and a peripheral level signal from the peripheral;
   an interrupt request generator configured to generate an indication SerIRQ including a plurality of indication interrupt bits according to the peripheral level signal based on the blank SerIRQ, the plurality of indication interrupt bits including a binary code represented by a first level and a second level to identify the peripheral; and
   an interrupt signal transmitter configured to send the indication SerIRQ to the processor.

10. The serial interrupt device of claim 9, wherein the serial interrupt device is further configured to:
    assign the binary code to the peripheral before uniquely identifying the peripheral; and
    store a correspondence between the peripheral level signal of the peripheral and the binary code in advance.

11. The serial interrupt device of claim 10, wherein:
    the blank SerIRQ includes a start, a stop, and a plurality of blank interrupt bits located between the start and the stop, and the plurality of blank interrupt bits are represented in the form of the first level having a plurality of clock cycles.

12. The serial interrupt device of claim 11, wherein the interrupt request generator is further configured to:
    determine the binary code of the peripheral based on the received peripheral level signal and the stored correspondence between the peripheral level signal and the binary code; and
    convert the plurality of blank interrupt bits into the plurality of indication interrupt bits according to the binary code, the first level representing a low binary bit, and the second level representing a high binary bit.

13. The serial interrupt device of claim 10, wherein the interrupt signal transmitter is further configured to:
    send the correspondence between the peripheral level signal of the peripheral and the binary code to the processor, in response to receiving the indication SerIRQ, based on the correspondence and the plurality of indication interrupt bits of the indication SerIRQ, the processor being configured to determine the peripheral requesting an interrupt.

14. The serial interrupt device of claim 11, wherein a number of the clock cycles included in the plurality of blank interrupt bits is set by the processor.

15. The serial interrupt device of claim 9, wherein the interrupt signal transmitter is further configured to:
    set in advance an interrupt mask register including a mask indication bit used to indicate whether to mask a serial interrupt.

16. A serial interrupt processing method comprising:
    receiving, by a processor, an indication SerIRQ from a serial interrupt device, the indication SerIRQ including a plurality of indication interrupt bits, and the plurality of indication interrupt bits including a binary code represented by a first level and a second level to identify a peripheral requesting an interrupt; and performing, by the processor, a serial interrupt response based on the plurality of indication interrupt bits.

17. The method of claim 16, wherein:

a correspondence between a peripheral level signal of the peripheral and the binary code is received and stored by the serial interrupt device, the peripheral level signal of the peripheral and the binary code having a one-to-one correspondence.

18. The method of claim 17, wherein the indication SerIRQ is generated by the serial interrupt device by:

receiving a blank SerIRQ from either the processor or the peripheral and the peripheral level signal from the peripheral; and based on the blank SerIRQ, generating the indication SerIRQ including the plurality of indication interrupt bits according to the peripheral level signal.

19. The method of claim 18, wherein:

the blank SerIRQ includes a start, a stop, and a plurality of blank interrupt bits located between the start and the stop, the plurality of blank interrupt bits are represented in the form of the first level having a plurality of clock cycles; and the serial interrupt device generating the indication SerIRQ including the plurality of indication interrupt bits includes:

determining the binary code of the peripheral based on the received peripheral level signal and the correspondence between the peripheral level signal of the peripheral and the binary code; and according to the binary code, converting the plurality of blank interrupt bits into the plurality of indication interrupt bits, the first level representing a low binary bit, and the second level representing a high binary bit.

20. The method of claim 19, wherein performing the serial interrupt response based on the plurality of indication interrupt bits includes:

determining the peripheral requesting the interrupt based on the plurality of indication interrupt bits; and performing the serial interrupt response to the interrupt requested by the peripheral.

\* \* \* \* \*